Nov. 1, 1966  C. B. WATTS, JR  3,283,326
ANTENNA ARRAY AND METHOD FOR INSTRUMENT LANDING SYSTEMS
Filed Dec. 9, 1963  2 Sheets-Sheet 1
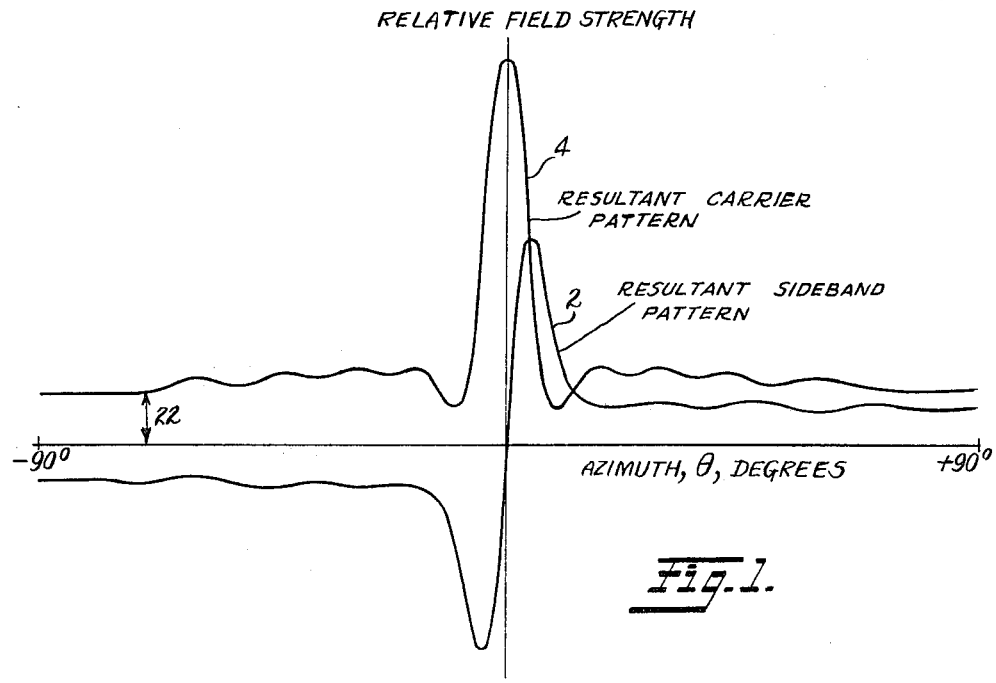
Fig. 1.
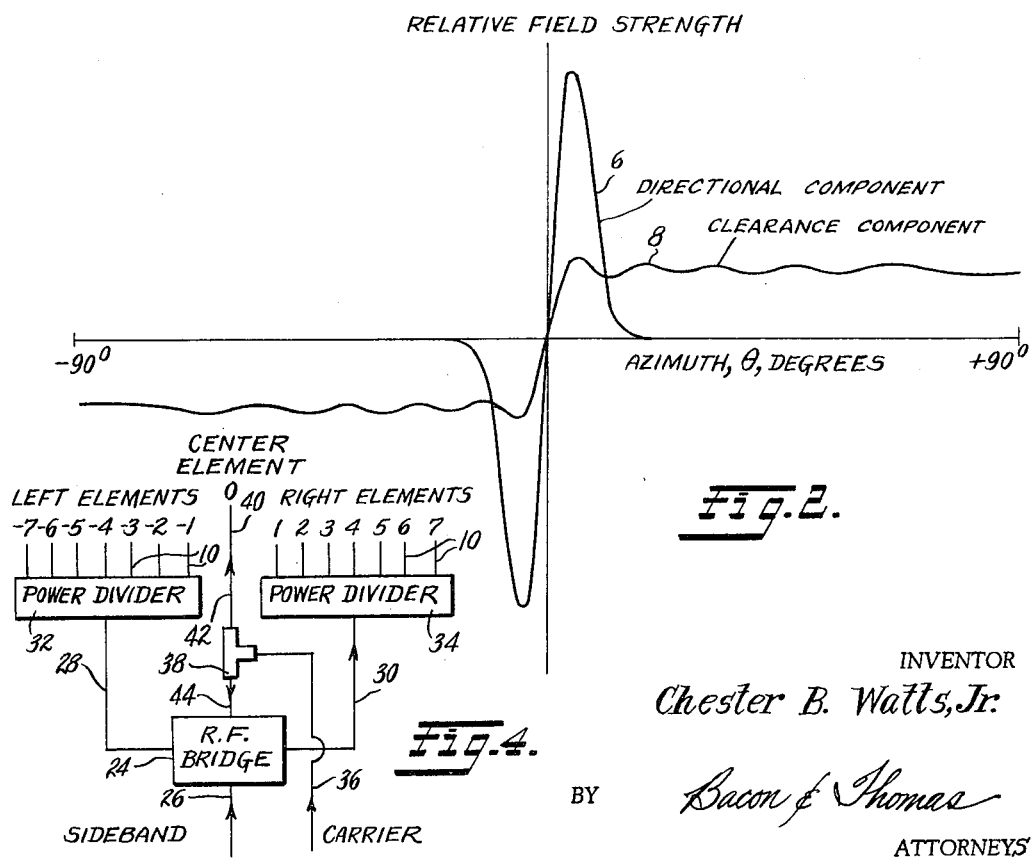
Fig. 2.
Fig. 4.
INVENTOR
Chester B. Watts, Jr.
BY
Bacon & Thomas
ATTORNEYS

United States Patent Office 3,283,326
Patented Nov. 1, 1966

3,283,326
ANTENNA ARRAY AND METHOD FOR
INSTRUMENT LANDING SYSTEMS
Chester B. Watts, Jr., Annandale, Va., assignor to Scanwell Laboratories, Inc., Springfield, Va., a corporation of Virginia
Filed Dec. 9, 1963, Ser. No. 328,853
4 Claims. (Cl. 343—107)

This invention relates to an instrument for use in the landing of airplanes, and more specifically to a transmitting antenna system, to be placed beyond the stop end of an airport runway, where the antenna system radiates directional patterns which provide lateral guidance for a landing airplane. Such an antenna system, in conjunction with a suitable transmitter, modulation equipment, and monitor, is known as a runway localizer.

Localizers in common use are based on the principle (described by A. Alford, in U.S. Patents 2,283,897 and 2,293,694, dated May 26, 1942, and August 25, 1942, respectively) of providing an array of antenna elements arranged and fed in such a way as to radiate simultaneously a pair of differently shaped directive patterns, each one of the pair being identified by a characteristic modulation of the transmitter signal. A suitable receiver for use with the system disclosed herein is shown in the "Transactions of the American Institute of Electrical Engineers," volume 59, on pages 849-858. FIG. 16 of that article, which was published in 1940, is a simplified schematic diagram of a suitable conventional receiver for use with the present invention. Pattern pairs of the type to which I refer have been known by a variety of different names—some of the names are descriptive of pattern shape; others are descriptive of function. For clarification, I have listed some commonly used names as follows:

|     | (a)       | (b)         |
|-----|-----------|-------------|
| (1) | Dumbbell  | Cloverleaf. |
| (2) | Even      | Odd.        |
| (3) | Sum       | Difference. |
| (4) | Sense     | Null.       |
| (5) | Reference | Deviation.  |
| (6) | Carrier   | Sideband.   |

(1) describes the pattern shapes in early forms of localizer, now obsolete. (2) is mathematically descriptive of the two types of pattern shape. (3) refers to the manner of formation of the two pattern types, and is a usage common in the field of monopulse radar. (4) is used in the field of radio direction finding. (5) is descriptive of the function of the two patterns. (6) refers to the distinctive types of energy associated with each pattern, which are more fully and correctly designated as (a) carrier plus reference sidebands and (b) deviation sidebands only.

The conventional localizer has, for many years, suffered more or less from the deficiency that bends in the course are produced by reflections of sidebands signals from hangars, hills, and other man-made or natural features at or near the airport site. The reflected sideband signals are received by the approaching airplane along with the direct signal, where they add in varying phase relation to produce either a general course roughness, where there are numerous reflecting objects, or sinusoidal indicator oscillations, where there is a single predominate reflector. Substantial immunity from such reflection effects has been obtained in the so-called "directional localizer" (described by A. Alford in U.S. Patent 2,682,050, dated June 22, 1954), wherein the major portion of the radiated energy is confined to a narrow sector centered along the runway centerline. The directivity approach has been carried even further in the slotted-waveguide localizer (described by C. Watts, Jr. in Proceedings of the Institute of Radio Engineers, October 1952, "Simultaneous Radiation of Odd and Even Patterns by a Linear Array"). With any directional localizer, however, there is the problem of providing proper signals in the azimuth directions outside the main beam; that is, in the minor-lobe regions of the directive array. This problem customarily is solved by adding a second transmitter feeding a second antenna array of more or less conventional type. The second system operates on a carrier frequency only a few kilocycles removed from the first so that both are received at the airplane within the pass-band of the same nominal receiver channel. This second or "clearance" array overrides the minor lobes of the main array, to provide full indicator deflection to the sides. At the same time, it does not contribute bends to the course produced by the main array because of the difference in R.F. carrier frequencies.

It is a purpose of this invention to provide a localizer antenna array which, to some extent, achieves the bend immunity of the directional localizer, but without using a second transmitter and separate clearance array. This is done by producing a specially-shaped pair of patterns, sideband and carrier, which are sharply directive in the sector centered on the runway where the course is produced, but which do not have the minor lobes and nulls to the sides which are characteristic of the usual directional localizer main array. Instead, the pattern shapes are controlled to the sides so as to maintain the clearances, at reduced level, so that the proper deflection of the airborne indicator is secured throughout 360 degrees of azimuth.

It is a principal object of this invention to provide the means for producing the foregoing specially-shaped patterns. These means comprise a relatively simple feed network with only one R.F. hybrid and three R.F. power-dividers.

The purposes and features of the invention will be more clearly understood when considered in conjunction with the accompanying drawing in which:

FIG. 1 is a graph showing the specially-shaped pair of radiation patterns, sideband and carrier;

FIG. 2 is a graph showing the two component parts which are added to form the sideband pattern;

FIG. 4 is a schematic diagram of a feed-network for providing the required sideband and carrier distributions.

Figure 3:
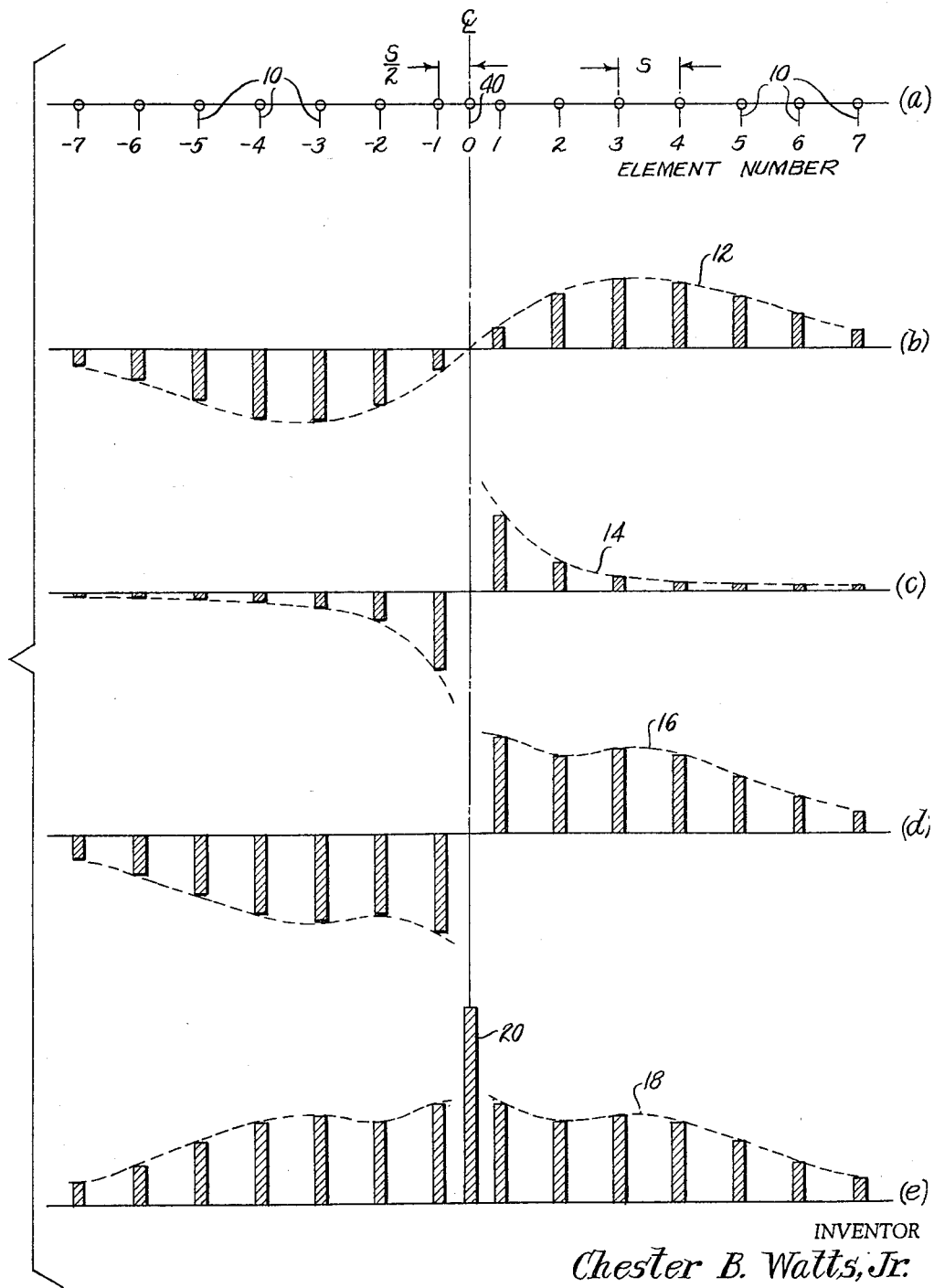
FIG. 3a shows a linear array of antenna elements.
FIG. 3b shows element current distribution to produce one component of the sideband pattern.
FIG. 3c shows element current distribution to produce a second component of the sideband pattern.
FIG. 3d shows total element current distribution to produce the sideband pattern.
FIG. 3e shows element current distribution to produce the carrier pattern.

In FIG. 1, curve 2 is a sideband pattern produced by a linear array of omni-directional antenna elements. The plot shows relative radiated field strength versus azimuth angle over the range minus 90 to plus 90 degrees. It is to be understood that the remaining half of the azimuth circle would be plotted as a mirror image of the first half shown. If the elements were not omni-directional, but had a directive pattern of their own, then curve 2 would be termed the sideband "array-factor"; in order to obtain the actual array pattern, one would then have to multiply the array-factor by the pattern of the individual element. Similarly, the curve 4 is a plot of the carrier pattern. The special feature of the pair of patterns 2 and 4 shown in FIG. 1 is that there is a substantial concentration of radiation around zero azimuth and yet, in the low radiation regions to the sides, neither pattern ever drops to zero—to do so would be to produce a "false course." The sideband pattern 2 crosses the zero axis only at zero azimuth and again at 180 degrees azimuth, and in doing so it defines the front and back course of the localizer.

Sideband pattern 2 may be considered as having two component parts, shown in FIG. 2; directional component 6, and clearance component 8. It is helpful to consider these components one at a time, even though they do not exist separately.

A symmetrical linear array of antenna elements is shown schematically in FIG. 3a. There are fourteen elements 10 with equal spacing, s, plus a fifteenth element on the centerline spaced a distance s/2 from its immediate neighbors. To be consistent with the patterns plotted in FIG. 1 and FIG. 2, spacing s has a value corresponding to 254 electrical degrees. The exact number of elements and spacings thereof, however, are not essential to the understanding of the invention.

The sideband pattern, as is well known, is computed by addition of a series of sine terms, as follows:

$$F = 2I_1 \sin\left(\frac{S}{2} \sin \theta\right)$$
$$+ 2I_2 \sin\left(3\frac{S}{2} \sin \theta\right)$$
$$+ 2I_3 \sin\left(5\frac{S}{2} \sin \theta\right)$$
$$+ \cdots$$

where $F_S$ is a quantity proportional to the sideband field strength
$\theta$ is azimuth angle measured from broadside
$S$ is element spacing measured in electrical degrees of equivalent length at the carrier frequency
$I_n$ is the current flowing in each element of $n$th pair.

The varition of $I_n$ with element number is known as the current distribution. FIG. 3b is a bar graph showing current distribution to produce sideband directional component 6, the bars projecting below the zero axis representing reverse polarity. The shape 12 of the current distribution to produce radiation pattern 6 of FIG. 2, with little or no minor side lobes, may be derived ts has been done in the past for the directional localizer, by taking the difference between successive terms of a binomial series. Alternatively, shape 12 may be derived from the slope of the well-known Gaussian error curve, and may be expressed mathematically by the formula $$I = AXE^{-KX2}$$

where $$K = \frac{2\pi^4 \theta_{max.}^2}{(180)^2 \lambda^2}$$

in which $X$ is the distance of an element from the array centerline
$I$ is the element current expressed as a function of distance from centerline
$A$ is an arbitrary amplitude constant
$\theta_{max}$ is the azimuth angle, in degrees, corresponding to maximum sideband field strength
$\lambda$ is the operating wavelength The current distribution necessary to produce the sideband clearance component 8 of FIG. 2 is shown similarly in FIG. 3c, but its shape 14 is quite different. This shape is derived from an amplitude inversely proportional to the distance from the array centerline. The shape of component 8 may be considered as a square-wave approximation; the amplitude coefficients of the sine series for producing it are well known. See for example R. M. Kerchner and G. F. Corcoran, "Alternating-Current Circuits" John Wiley & Sons, 3rd edition, 1953, p. 171, where it is shown that the harmonic amplitude is inversely proportional to the harmonic number. The amplitudes are thus proportional to 1, ⅓, ⅕, ⅐, etc.

FIG. 3d, shows the current distribution of the total desired sideband pattern 2 of FIG. 1 and is simply the sum of the two component distributions FIG. 3b and FIG. 3c. Shapes 12 and 14 add in proper proportions in FIG. 3d to produce shape 16. The remarkable thing here is the extent to which shape 16 can be made to approximate (except for the phase-reversal about the array centerline) the current distibution required for a low side side lobe carrier pattern. Such a distribution, ideally, has a shape following the binomial series coefficients or the Gaussian curve.

This, then, leads to a principal feature of the invention: Simply by reversing the antenna element current polarities on the left side of the centerline, the carrier current distribution, FIG. 3e is obtained. Shape 18 is the same as shape 16. The center element, unused in the sideband distribution, is supplied sufficient carrier current 20 to raise the carrier pattern 4 of FIG. 1 above the zero axis to the level 22 in order to assure that the carrier field strength does not fall to zero at any azimuth angle.

The carrier pattern, then, is computed by addition of a series of cosine terms, with coefficients identical to those used in the sine series for the side band pattern. There is just one degree of freedom left: choice of the coefficient $I_0$ representing the carrier current in the center antenna:

$$F_c = I_0$$
$$+ 2I_1 \cos\left(\frac{S}{2} \sin \theta\right)$$
$$+ 2I_2 \cos\left(3\frac{S}{2} \sin \theta\right)$$
$$+ 2I_3 \cos\left(5\frac{S}{2} \sin \theta\right)$$
$$+ \cdots$$

The computed element current values required for the pattern-pair plotted in FIG. 1 are tabulated as follows:

| Element Number | Carrier Current | Sideband Current |
|---|---|---|
| 7 | .244 | .244 |
| 6 | .412 | .412 |
| 5 | .620 | .620 |
| 4 | .805 | .805 |
| 3 | .879 | .879 |
| 2 | .820 | .820 |
| 1 | 1.000 | 1.000 |
| 0 | 2.000 | 0 |
| −1 | 1.000 | −1.000 |
| −2 | .820 | −.820 |
| −3 | .879 | −.879 |
| −4 | .805 | −.805 |
| −5 | .620 | −.620 |
| −6 | .412 | −.412 |
| −7 | .244 | −.244 |

Application of the principle, which has been described, to the design of an actual feed network results in a system which is unusually simple for a large-aperture localizer. Referring to FIG. 4, only a single R.F. bridge (hybrid) 24 is required. Sideband power flowing in line 26 is divided by the bridge into two equal parts flowing in lines 28 and 30 in opposite polarities. Identical multi-port power dividers 32 and 34 subdivide the power respectively for the left side and right side antenna elements, in accordance with the prescribed current distribution.

Carrier power is fed into line 36, whence it flows through a two-way power divider, 38, which is arranged to bleed off the necessary power for the center antenna element 40 via line 42. The remainder flows through line 44 to the R.F. bridge, where it is divided into two equal parts flowing in the same lines 28 and 30, the polarities being, in this case, the same rather than opposite. The carrier power is sub-divided for the left and right side elements by the same multi-port dividers 32 and 34.

Having described a specific embodiment of this invention, it should be understood that the object can be achieved without using the particular number of elements, element spacings or element currents specified, nor is it even necessary that the element spacings be uniform throughout the array.

I claim:

1. A localizer transmitting antenna array comprising a symmetrical rectilinear arrangement of an odd number of radiating elements including a center element, a first power divider feeding all the elements on one side of said center element in a predetermined amplitude distribution pattern, a second identical power divider feeding all the elements on the other side of said center element in said predetermined amplitude distribution pattern, an R.F. bridge connected to feed a first signal to said first and second power dividers in equal amplitudes and opposite phases, a third power divider for dividing a second signal into two parts, means for feeding the first of said two parts to the center element of the array, and means for feeding the second of said two parts to said R.F. bridge to produce currents of equal amplitude and the same phase in said first and second power dividers.

2. A localizer transmitting antenna array comprising a symmetrical rectilinear arrangement of an odd number of radiating elements, including a center element, means for feeding a sideband signal in a predetermined amplitude distribution pattern to all the elements on one side of said center element in one polarity, and also to all the elements on the other side of said center element but in opposite polarity, means for feeding a carrier signal to said center element and also to the elements on the respective sides thereof in said same predetermined amplitude distribution pattern, but in the same polarity in each half.

3. The method of transmitting a predetermined directional pattern of radiation for guiding a landing aircraft, comprising the steps of: transmitting a first signal from a first region; transmitting from a second region adjacent said first region, a second signal; maintaining said first and second signals of equal amplitude and opposite in phase; producing a third signal; transmitting one portion of said third signal from a third region between said first and second regions; dividing the remaining portion of said third signal into two parts of equal amplitude and in the same phase; and transmitting said two parts, respectively from said first and second regions.

4. The method of claim 3 wherein the steps of transmitting said signals from said first and second regions comprises transmitting from a plurality of points in each region; and controlling the amplitude of the signal transmitted from each point so that the amplitude at each point is inversely related to the distance of that point from said third region.

References Cited by the Examiner

UNITED STATES PATENTS

| | | | |
|---|---|---|---|
| 2,379,442 | 7/1945 | Kandoian | 343—108 |
| 2,422,076 | 6/1947 | Brown | 343—108 |
| 2,685,688 | 8/1954 | Casabona | 343—108 |
| 3,007,162 | 10/1961 | Kruesi | 343—107 |
| 3,202,992 | 8/1965 | Kent et al. | 343—100.6 |

CHESTER L. JUSTUS, *Primary Examiner.*

H. C. WAMSLEY, *Assistant Examiner.*